2 Sheets—Sheet 1.
F. MURGATROYD.
Hoisting Engine.
No. 9,378. Reissued Sept. 14, 1880.
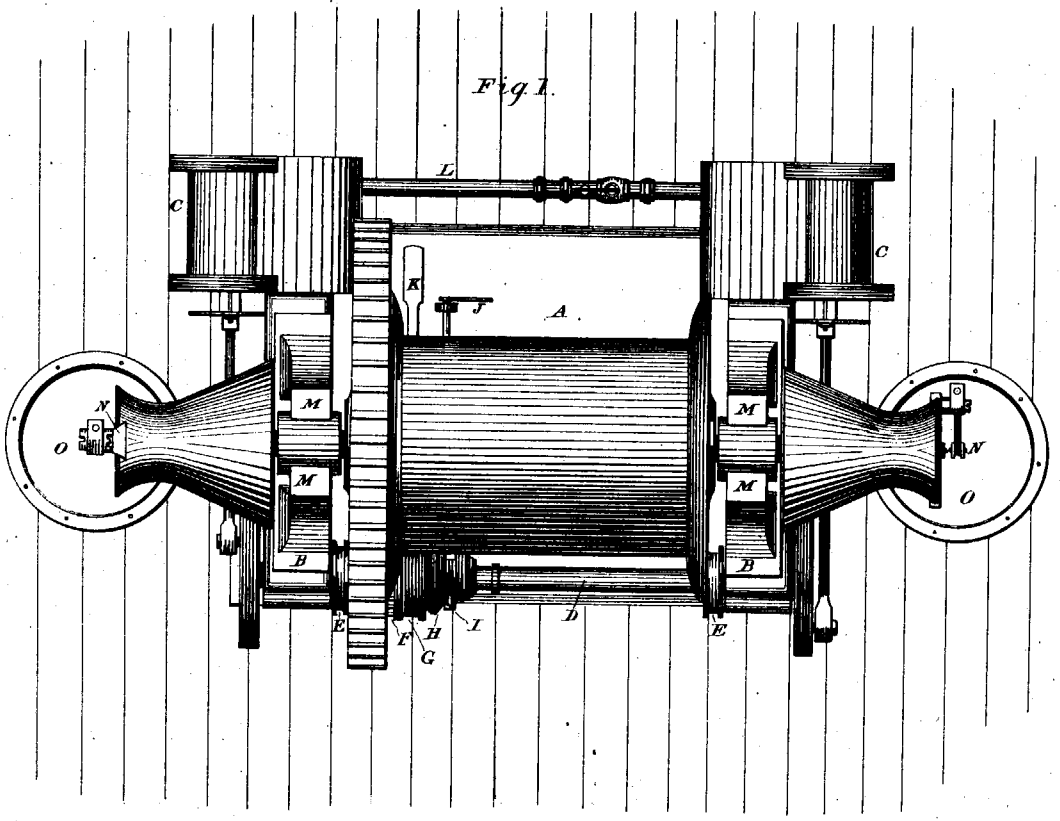
WITNESSES
S. J. Lehman
A. W. Bright
INVENTOR
Frank Murgatroyd
By Seagrett & Seagrett.
ATTORNEY
N. PETERS, PHOTO-LITHOGRAPHER, WASHINGTON, D. C.

2 Sheets—Sheet 2.
F. MURGATROYD.
Hoisting Engine.
No. 9,378. Reissued Sept. 14, 1880.
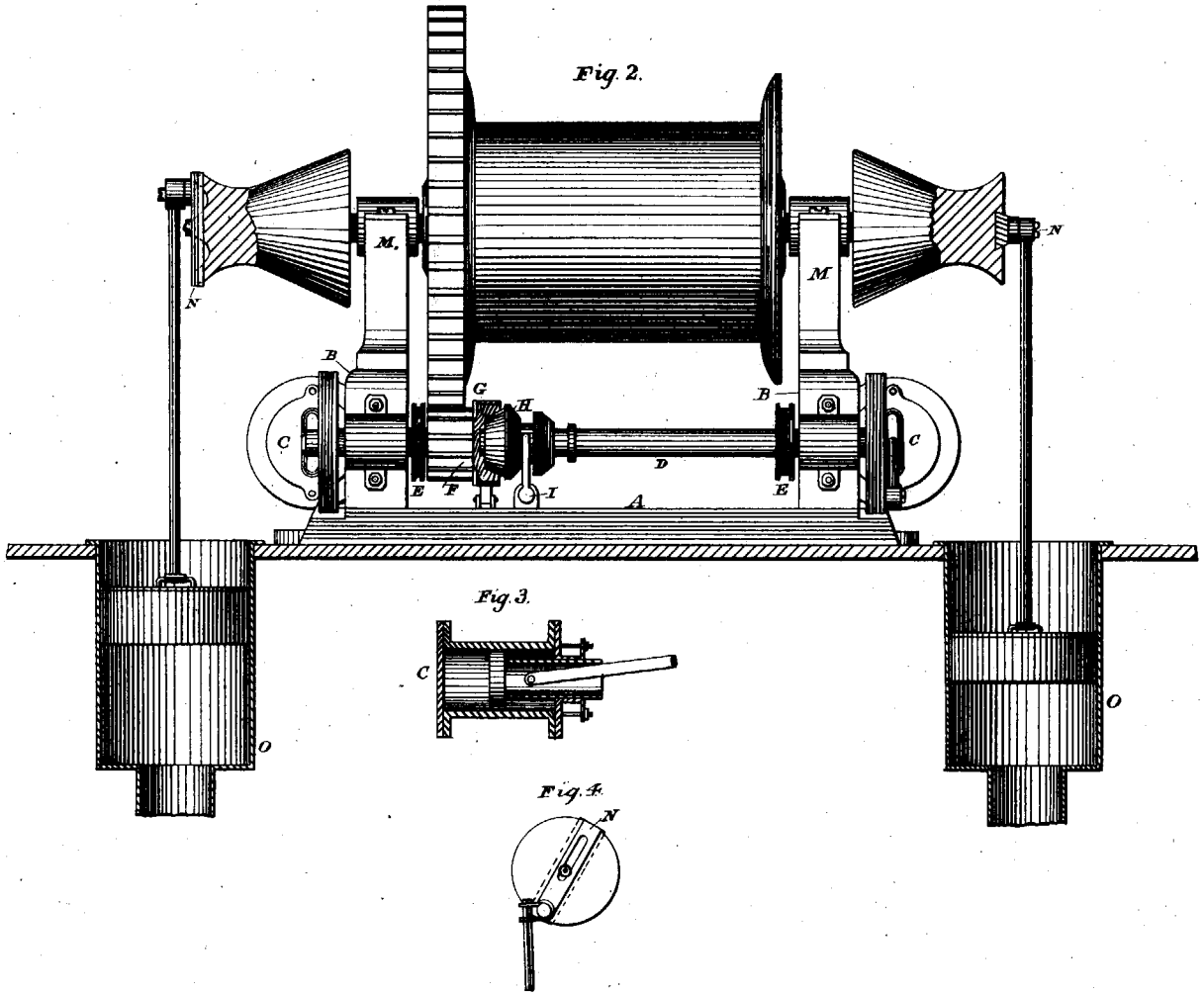
WITNESSES
O. J. Lehman.
A. M. Bright
INVENTOR
Frank Murgatroyd.
By Seggett & Seggett.
ATTORNEY
N. PETERS, PHOTO-LITHOGRAPHER, WASHINGTON, D. C.

UNITED STATES PATENT OFFICE.

FRANK MURGATROYD, OF CLEVELAND, OHIO.

HOISTING-ENGINE.

SPECIFICATION forming part of Reissued Letters Patent No. 9,378, dated September 14, 1880.

Original No. 144,217, dated November 4, 1873. Application for reissue filed April 7, 1880.

*To all whom it may concern:*

Be it known that I, FRANK MURGATROYD, of Cleveland, State of Ohio, have invented certain new and useful Improvements in Hoisting-Engines; and I declare that the following is a full, clear, and exact description of the invention, which will enable any one skilled in the art to make and use the same.

My invention relates to hoisting-engines, and particularly to that class used on shipboard; and it consists in attaching pump-cranks adapted to carry pump-rods to the winch-heads, and thus operating the bilge-pumps by the same power used in operating the hoisting device; also, in combining with the hoisting device a horizontal engine adapted to operate the same; also, in construction and combination of parts that will more fully hereinafter appear.

The object of my invention is to adapt the power used in operating the hoisting device for working the bilge-pumps by simple and inexpensive mechanism.

In the drawings, Figure 1 represents a plan view of my engine; Fig. 2, a view in side elevation thereof. Fig. 3 is a view, in longitudinal vertical section, of one of the cylinders C; and Fig. 4 is a detached view, showing in end elevation the face of one of the pump-rod cranks N.

I have in this reissue amended the drawings by showing my device in different views from that shown in the original, for the purpose of better illustrating it, inasmuch as the drawings accompanying my original specification were insufficient.

In these drawings, A is a bed-plate, upon each end of which are placed the castings B B, which form the bases of the bearings for the drum-shaft and winch-heads, and also forming the supports for the cylinders C C, one head for which cylinders is cast with the supports B B. The bearings for the shaft D are also formed in one end of the said bases. The cylinders C C are bolted to the heads at the other end of said bases B B and their valve and steam-chests cast with them, and which steam-chests are on the sides of the cylinders toward each other, so that the valve-rods connect with the eccentrics on the inside of said bases B B.

The engines are small trunk-engines, by means of which the cross-head and slides are done away with.

Upon the shaft D are the eccentrics E E. On the said shaft is a loose pinion, F, having a brake-wheel, G, cast with it and forming part of it. By the side of said pinion is a clutch, H, on the shaft D, operated by a rock-shaft, I, and lever J, pivoted to the bed-plate A. A brake-lever, K, is also hinged to the bed-plate A, which draws on a strap around the brake-wheel G.

The steam-pipe L connects the two engines, conducting steam to each alike.

It will be observed that these engines are horizontal, and all the machinery for generating and controlling and regulating the power lies low down near the bed-plate, is compact and out of the way, leaving all sides of the drum and winch-heads clear and always accessible.

I find that placing the cylinders in the position shown is a matter of importance. Furthermore, in the position shown the engine is down near to the deck and out of the way of the winches and hoisting-drum. I also prefer to place an engine, as shown, upon each side of the hoisting mechanism, thereby securing more advantageous application of power.

Bolted to the upper side of the bases B B are the uprights M M, in the top of which are the journal-boxes for the drum-shaft. The drum-shaft carries a drum, and has winch-heads on each end outside of the uprights M M. The said drum-shaft is operated by a large gear-wheel geared with the pinion F. To the outer ends of the winch-heads are attached adjustable crank-bars N N, having a slot in them, (see Fig. 4,) through which a set-screw passes, whereby they may be adjusted to give more or less stroke to the cranks, as may be desired.

By the sides of the engine are bilge-pumps O O, the pump-rods of which are attached to the cranks N N.

The connections of the pump-rods are such that they may be readily connected when the engine is to be employed for pumping, and when not so used the cranks N N may be reefed in flush with the winch-heads, so as to form no obstruction to their use for the handling and hauling of lines.

What I claim is—

1. The combination, with the winch-head of a hoisting device, of a crank or wrist pin for attaching a pump-rod, whereby the same power that operates the hoisting mechanism can be used for operating pumps, substantially as and for the purposes specified.

2. The horizontal engine C, in combination with the base B and bed-plate A and uprights M M, adapted to support the ends of the drum carrying a winch-head, the latter provided with cranks for working the pump-rod O, substantially as shown and described.

3. The combination, with a drum-shaft of a hoisting device, of a winch-head provided with a crank adapted to operate a pump-rod, substantially as and for the purposes specified.

4. The bases B B, cast with bed-plate A, the engines C C, shaft D, loose pinion F, brake-wheel G, clutch H, and uprights M M supporting the drum and winch-heads, all combined and operating substantially as described.

In testimony whereof I have signed my name to this specification in the presence of two subscribing witnesses.

FRANK MURGATROYD.

Witnesses:

JNO. CROWELL, JR.,

W. E. DONNELLY.